US012356504B2

(12) United States Patent
Jung et al.

(10) Patent No.: US 12,356,504 B2
(45) Date of Patent: Jul. 8, 2025

(54) APPARATUS AND METHOD OF DETERMINING AN OPERATION MODE ON A WIRELESS NETWORK

(71) Applicant: Lenovo (Singapore) PTE. LTD, Singapore (SG)

(72) Inventors: Hyejung Jung, Northbrook, IL (US); Joachim Löhr, Wiesbaden (DE); Ravi Kuchibhotla, Gurnee, IL (US); Hyung-Nam Choi, Ottobrunn (DE); Prateek Basu Mallick, Langen (DE)

(73) Assignee: Lenovo (Singapore) PTE. LTD, Singapore (SG)

( * ) Notice: Subject to any disclaimer, the term of this patent is extended or adjusted under 35 U.S.C. 154(b) by 310 days.

(21) Appl. No.: 17/927,318

(22) PCT Filed: May 27, 2021

(86) PCT No.: PCT/US2021/034378
§ 371 (c)(1),
(2) Date: Nov. 22, 2022

(87) PCT Pub. No.: WO2021/242940
PCT Pub. Date: Dec. 2, 2021

(65) Prior Publication Data
US 2023/0217240 A1 Jul. 6, 2023

Related U.S. Application Data

(60) Provisional application No. 63/031,538, filed on May 28, 2020.

(51) Int. Cl.
*H04W 8/18* (2009.01)

(52) U.S. Cl.
CPC .................. *H04W 8/186* (2013.01)

(58) Field of Classification Search
CPC ............................................ H04W 8/18
See application file for complete search history.

(56) References Cited

U.S. PATENT DOCUMENTS

| 2012/0040700 A1* | 2/2012 | Gomes | H04W 68/00 455/500 |
| 2013/0155948 A1* | 6/2013 | Pinheiro | H04W 4/70 370/328 |

(Continued)

OTHER PUBLICATIONS

3rd Generation Partnership Proje , "Access restriction control for MTC Groups", 3GPP TSG SA WG2 Meeting #79E (Electronic), TD S2-103190, [retrieved from the internet on Oct. 10, 2024], <https://www.3gpp.org/FTP/tsg_sa/WG2_Arch/TSGS2_79E_Elbonia/Docs>, Jul. 6, 2010, 4 pages.

(Continued)

*Primary Examiner* — Michael T Vu
(74) *Attorney, Agent, or Firm* — FIG. 1 Patents

(57) ABSTRACT

An operation mode from a plurality of operation modes can be determined (310) based on at least one traffic type originated from a UE. The plurality of operation modes can include at least one group operation mode and an individual operation mode. The at least one group operation mode can support a plurality of UEs grouped into a group of UEs. The at least one group operation mode can support at least one network entity communicating associated messages with the group of UEs including the UE. The associated messages can be associated with the group of UEs. A network entity can be informed (320) of the determined operation mode.

20 Claims, 4 Drawing Sheets

(56) References Cited

U.S. PATENT DOCUMENTS

2014/0179324 A1\* 6/2014 Lee .................... H04W 52/244
                                                       455/437
2016/0165412 A1   6/2016 Lee et al.

OTHER PUBLICATIONS

3rd Generation Partnership Proje , "Technical Specification Group Services and System Aspects; Procedures for the 5G System (5GS); Stage 2 (Release 16)", [retrieved from the internet on Oct. 10, 2024], <https://portal.3gpp.org/desktopmodules/Specifications/SpecificationDetails.aspx?specificationId=3145>, Mar. 2020, 582 pages.

PCT/US2021/034378 , "International Search Report and Written Opinion", International Application No. PCT/US2021/034378, Sep. 23, 2021, 14 pages.

"Foreign Office Action", EP Application No. 21735472.9, Feb. 21, 2025, 5 pages.

\* cited by examiner

APPARATUS AND METHOD OF DETERMINING AN OPERATION MODE ON A WIRELESS NETWORK

BACKGROUND

1. Field

The present disclosure is directed to an apparatus and method of determining an operation mode on a wireless network.

2. Introduction

Presently, wireless communication devices, such as UEs, communicate with other communication devices using wireless signals. In IIoT applications, AI inference engines and/or ML algorithms may use a set of real-time data collected from a group of sensors/devices to generate a set of real-time control parameters for desired actions at machines or other objects. Similarly, in XR applications such as gaming, latency-sensitive set of data collected from many sensors/devices (e.g. motion devices, cameras, and audio devices) may be used for real-time rendering and virtual control.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. At least some embodiments can provide for an apparatus and method of determining an operation mode on a wireless network. At least some embodiments can provide group communication for IIoT and XR. According to a possible embodiment, an operation mode from a plurality of operation modes can be determined based on at least one traffic type originated from a UE. The plurality of operation modes can include at least one group operation mode and an individual operation mode. The at least one group operation mode can support a plurality of UEs grouped into a group of UEs. The at least one group operation mode can support at least one network entity communicating associated messages with the group of UEs including the UE. The associated messages can be associated with the group of UEs. A network entity can be informed of the determined operation mode.

Figure 1:
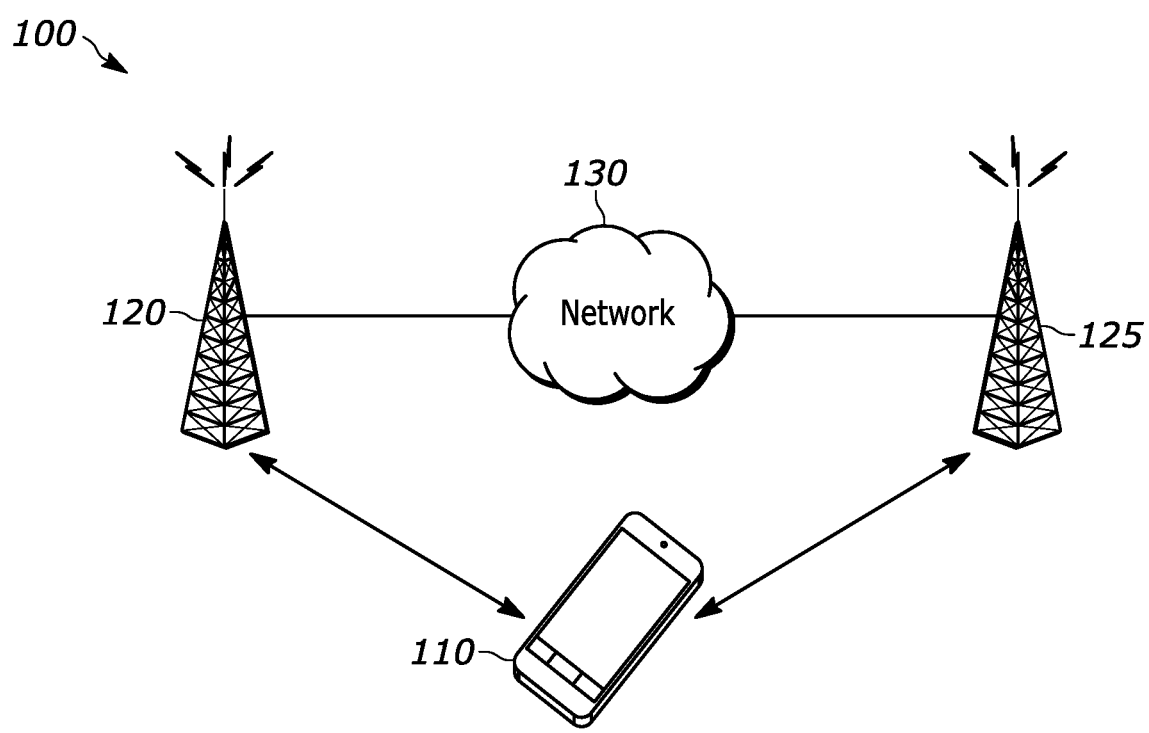
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an IoT device, or any other user device that is capable of sending and receiving communication signals on a wireless network. The at least one network entity 120 and 125 can be a wireless wide area network base station, can be a NodeB, can be an eNB, can be a gNB, such as a 5G NodeB, can be an unlicensed network base station, can be an access point, can be a base station controller, can be a network controller, can be a TRP, can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a TDMA-based network, a CDMA-based network, an OFDMA-based network, an LTE network, a NR network, a 3GPP-based network, a 5G network, a satellite communications network, a high-altitude platform network, the Internet, and/or other communications networks.

In operation, the UE 110 can communicate with the network 130 via at least one network entity 120. For example, the UE 110 can send and receive control signals on a control channel and user data signals on a data channel.

For massive MTC with small size packets, e.g. smart meter or power grid applications, a network architecture, where an aggregator collects data from a group of sensors via sidelink communications and relays the data to a network entity of cellular networks, is possible instead of the group of sensors being connected to the network entity directly. Also, a group-common PDCCH based wake-up signal was specified in 3GPP Rel-16 NR.

In real-time control and XR applications with AI/ML, sizes of packets and amount of data that each sensor/device generates may be much larger (e.g. ultra-high definition video) compared to low cost MTC devices, e.g. smart meter sensors. Furthermore, the new applications may require using data collected from a set of physically non-co-located/remote (i.e. devices located outside of side-link communication range) and yet associated devices (in terms of application-level data). Thus, the network architecture considered for massive MTC and some of physical layer features (e.g. group-common signaling) without taking into account application-layer level association may not fully address the new challenges of real-time control and rendering.

The following describes part of 3GPP specification texts from 3GPP TS 23.501 (Release 16) and 3GPP TS 33.501 (Release 16) regarding various identifiers supported in a 5G system, details of support for 5G LAN-type service using External and Internal Group IDs, and update of a subscription temporary identifier.

From 3GPP TS 23.501 (Release 16), 5.9 Identifiers, 5.9.1 General, each subscriber in the 5G System shall be allocated one 5G SUPI for use within the 3GPP system. The 5G System supports identification of subscriptions independently of identification of the user equipment. Each UE accessing the 5G System shall be assigned a PEI.

The 5G System supports allocation of a temporary identifier (5G-GUTI) in order to support user confidentiality protection.

According to 5.9.2, Subscription Permanent Identifier, a globally unique 5G Subscription Permanent Identifier (SUPI) shall be allocated to each subscriber in the 5G System and provisioned in the UDM/UDR. The SUPI is used only inside 3GPP system, and its privacy is specified in TS 33.501 [29].

The SUPI may contain: an IMSI as defined in TS 23.003 [19], or a network-specific identifier, used for private networks as defined in TS 22.261 [2], a GLI and an operator identifier of the 5GC operator, used for supporting FN-BRGs, as further described in TS 23.316 [84], a GCI and an operator identifier of the 5GC operator, used for supporting FN-CRGs and 5G-CRG, as further described in TS 23.316 [84].

A SUPI containing a network-specific identifier shall take the form of a NAI using the NAI RFC 7542 [20] based user identification as defined in TS 23.003 [19]. When UE needs to indicate its SUPI to the network (e.g. as part of the Registration procedure), the UE provides the SUPI in concealed form as defined in TS 23.003 [19]. In order to enable roaming scenarios, the SUPI shall contain the address of the home network (e.g. the MCC and MNC in the case of an IMSI based SUPI). For interworking with the EPC, the SUPI allocated to the 3GPP UE shall always be based on an IMSI to enable the UE to present an IMSI to the EPC. The usage of SUPI for W-5GAN is further specified in TS 23.316 [84].

According to 5.9.2a, Subscription Concealed Identifier, the Subscription Concealed Identifier (SUCI) is a privacy preserving identifier containing the concealed SUPI. It is specified in TS 33.501 [29]. The usage of SUCI for W-5GAN access is further specified in TS 23.316 [84].

According to 5.9.3, Permanent Equipment Identifier, a Permanent Equipment Identifier (PEI) is defined for the 3GPP UE accessing the 5G System. The PEI can assume different formats for different UE types and use cases. The UE shall present the PEI to the network together with an indication of the PEI format being used. If the UE supports at least one 3GPP access technology (i.e. NG-RAN, E-UTRAN, UTRAN or GERAN), the UE must be allocated a PEI in the IMEI or IMEISV format.

In the scope of this release, the PEI may be one of the following: for UEs that support at least one 3GPP access technology, an IMEI or IMEISV, as defined in TS 23.003 [19]; PEI used in the case of W-5GAN access as further specified in TS 23.316 [84]; for UEs not supporting any 3GPP access technologies, the IEEE Extended Unique Identifier EUI-64 [113] of the access technology the UE uses to connect to the 5GC.

According to 5.9.4, 5G Globally Unique Temporary Identifier, the AMF shall allocate a 5G Globally Unique Temporary Identifier (5G-GUTI) to the UE that is common to both 3GPP and non-3GPP access. It shall be possible to use the same 5G-GUTI for accessing 3GPP access and non-3GPP access security context within the AMF for the given UE. An AMF may re-assign a new 5G-GUTI to the UE at any time. The AMF provides a new 5G-GUTI to the UE under the conditions specified in clause 6.12.3 in TS 33.501 [29]. When the UE is in CM-IDLE, the AMF may delay providing the UE with a new 5G-GUTI until the next NAS transaction.

The 5G-GUTI shall be structured as:
<5G-GUTI>:=<GUAMI><5G-TMSI>
where GUAMI identifies one or more AMF(s).

When the GUAMI identifies only one AMF, the 5G-TMSI identifies the UE uniquely within the AMF. However, when AMF assigns a 5G-GUTI to the UE with a GUAMI value used by more than one AMF, the AMF shall ensure that the 5G-TMSI value used within the assigned 5G-GUTI is not already in use by the other AMF(s) sharing that GUAMI value. The Globally Unique AMF ID (GUAMI) shall be structured as:
<GUAMI>:=<MCC><MNC><AMF Region ID><AMF Set ID><AMF Pointer>
where AMF Region ID identifies the region, AMF Set ID uniquely identifies the AMF Set within the AMF Region and AMF Pointer identifies one or more AMFs within the AMF Set. NOTE 1: The AMF Region ID addresses the case that there are more AMFs in the network than the number of AMFs that can be supported by AMF Set ID and AMF Pointer by enabling operators to re-use the same AMF Set IDs and AMF Pointers in different regions. NOTE 2: In the case of SNPNs, the PLMN IDs may be shared among SNPNs such that the constructed GUAMIs are not globally unique. However, PLMN ID and NID are provided together, separate from the GUAMI, to uniquely identify selected or supported SNPN in RRC and N2. NOTE 3: See TS 23.003 [19] for details on the structure of the fields of GUAMI.

The 5G-S-TMSI is the shortened form of the GUTI to enable more efficient radio signaling procedures (e.g. during Paging and Service Request) and is defined as:
<5G-S-TMSI>:=<AMF Set ID><AMF Pointer><5G-TMSI>

As specified in TS 38.304 [50] and TS 36.304 [52] for 3GPP access, the NG-RAN uses the 10 Least Significant Bits of the 5G-TMSI in the determination of the time at which different UEs are paged. Hence, the AMF shall ensure that the 10 Least Significant Bits of the 5G-TMSI are evenly distributed. As specified in TS 38.331 [28] and TS 36.331 [51] for 3GPP access, the NG-RAN's RRC Connection Establishment's contention resolution process assumes that there is a low probability of the same 5G-TMSI being allocated by different AMFs to different UEs. The AMFs' process for allocating the 5G-TMSI should take this account. NOTE 4: To achieve this, the AMF could, for example, use a random seed number for any process it uses when choosing the UE's 5G-TMSI.

According to 5.9.5, AMF Name, an AMF is identified by an AMF Name. AMF Name is a globally unique FQDN, the structure of AMF Name FQDN is defined in TS 23.003 [19]. An AMF can be configured with one or more GUAMIs. At a given time, GUAMI with distinct AMF Pointer value is associated to one AMF name only.

According to 5.9.6, Data Network Name (DNN), a DNN is equivalent to an APN as defined in TS 23.003 [19]. Both identifiers have an equivalent meaning and carry the same information. The DNN may be used e.g. to: select a SMF and UPF(s) for a PDU Session; select N6 interface(s) for a PDU Session; Determine policies to apply to this PDU Session. The wildcard DNN is a value that can be used for the DNN field of Subscribed DNN list of Session Management Subscription data defined in clause 5.2.3.3 of TS 23.502 [3]. The wildcard DNN can be used with an S-NSSAI for operator to allow the subscriber to access any Data Network supported within the Network Slice associated with the S-NSSAI.

According to 5.9.7, Internal-Group Identifier, the subscription data for an UE in UDR may associate the subscriber with groups. A group is identified by an Internal-Group Identifier. NOTE 1: A UE can belong to a limited number of groups, the exact number is defined in stage 3 specifications. NOTE 2: In this Release of the specification, the support of groups is only defined in non-roaming case.

The Internal-Group Identifier(s) corresponding to a UE are provided by the UDM to the SMF as part Session Management Subscription data and (when PCC applies to a PDU Session) by the SMF to the PCF. The SMF may use this information to apply local policies and to store this information in CDR. The PCF may use this information to enforce AF requests as described in clause 5.6.7. The Internal-Group Identifier(s) corresponding to an UE are provided by the UDM to the AMF as part of Access and Mobility Subscription data. The AMF may use this information to apply local policies (such as Group specific NAS level congestion control defined in clause 5.19.7.5).

According to 5.9.8, Generic Public Subscription Identifier, Generic Public Subscription Identifier (GPSI) is needed for addressing a 3GPP subscription in different data networks outside of the 3GPP system. The 3GPP system stores within the subscription data the association between the GPSI and the corresponding SUPI. GPSIs are public identifiers used both inside and outside of the 3GPP system. The GPSI is either an MSISDN or an External Identifier, see TS 23.003 [19]. If MSISDN is included in the subscription data, it shall be possible that the same MSISDN value is supported in both 5GS and EPS. NOTE: There is no implied 1-to-1 relationship between GPSI and SUPI.

According to 5.9.9, AMF UE NGAP ID, an AMF UE NGAP ID is an identifier used to identify the UE in AMF on N2 reference point. AMF allocates the AMF UE NGAP ID and send it to the 5G-AN. For the following N2 signaling interaction sent from 5G-AN to AMF, AMF UE NGAP ID is used to identify the UE at the AMF. AMF UE NGAP ID is unique per AMF set. AMF UE NGAP ID may be updated without AMF change, or with AMF change as specified at clause 5.21.2.2.

According to 5.9.10, UE Radio Capability ID, The UE Radio Capability ID is a short pointer with format defined in TS 23.003 [19] that is used to uniquely identify a set of UE radio capabilities (i.e. UE Radio Capability information). The UE Radio Capability ID is assigned either by the serving PLMN or by the UE manufacturer, as follows: —UE manufacturer-assigned: The UE Radio Capability ID may be assigned by the UE manufacturer in which case it includes a UE manufacturer identification (i.e. a Vendor ID). In this case, the UE Radio Capability ID uniquely identifies a set of UE radio capabilities for a UE by this manufacturer in any PLMN. —PLMN-assigned: If a UE manufacturer-assigned UE Radio Capability ID is not used by the UE or the serving network, or it is not recognized by the serving PLMN UCMF, the UCMF may allocate UE Radio Capability IDs for the UE corresponding to each different set of UE radio capabilities the PLMN may receive from the UE at different times. In this case, the UE Radio Capability IDs the UE receives are applicable to the serving PLMN and uniquely identify the corresponding sets of UE radio capabilities in this PLMN. The PLMN assigned UE Radio Capability ID includes a Version ID in its format. The value of the Version ID is the one configured in the UCMF, at time the UE Radio Capability ID value is assigned. The Version ID value makes it possible to detect whether a UE Radio Capability ID is current or outdated. NOTE: For the case the PLMN is configured to store PLMN assigned IDs in the UE manufacturer-assigned operation requested list defined in clause 5.4.4.1a, then the algorithm for assignment of PLMN-assigned UE Radio Capability ID shall assign different UE Radio Capability IDs for UEs with different TAC value.

The type of UE Radio Capability ID (UE manufacturer-assigned or PLMN-assigned) is distinguished when a UE Radio Capability ID is signaled.

In 5.29, Support for 5G LAN-type service, according to 5.29.1, General, the service requirements for 5G LAN-type service are specified in TS 22.261 [2]. A 5G Virtual Network (VN) group consists of a set of UEs using private communication for 5G LAN-type services.

According to 5.29.2, 5G VN group management, 5G System supports management of 5G VN Group identification and membership (i.e. definition of 5G VN group identifiers and membership) and 5G VN Group data (i.e. definition of 5G VN group data). The 5G VN Group management can be configured by a network administrator or can be managed dynamically by AF.

A 5G VN group is characterized by the following: —5G VN group identities: External Group ID and Internal Group ID are used to identify the 5G VN group. —5G VN group membership: The 5G VN group members are uniquely identified by GPSI. The group as described in clause 5.2.3.3.1 of TS 23.502 [3] is applicable to 5G LAN-type services. —5G VN group data. The 5G VN group data may include the following parameters: PDU session type, DNN, S-NSSAI and Application descriptor, Information related with secondary authentication/authorization (e.g. to enable IP address assignment by the DN-AAA). The Information related with secondary authentication/authorization corresponds to the procedures described in clause 5.6.6; it allows e.g. the AF to provide DN-AAA server addressing information and possibly to request the SMF to get the UE IP address from the DN-AAA server.

In order to support dynamic management of 5G VN Group identification and membership, the NEF exposes a set of services to manage (e.g. add/delete/modify) 5G VN groups and 5G VN members. The NEF also exposes services to dynamically manage 5G VN group data. A 5G VN group is identified by the AF using External Group ID. The NEF provides the External Group ID to UDM. The UDM maps the External Group ID to Internal Group ID. For a newly created 5G VN Group, an Internal Group ID is allocated by the UDM. The NEF can retrieve the Internal Group ID from UDM via Nudm_SDM_Get service operation (External Group ID, Group Identifier translation). An External Group ID for a 5G VN group corresponds to a unique set of 5G VN group data parameters. The 5G VN group configuration is either provided by OA&M or provided by an AF to the NEF.

When configuration is provided by an AF, the procedures described in TS 23.502 [3] clause 4.15.6.2 apply for storing the 5G VN group identifiers, group membership information and group data in the UDR, as follows: —The NEF provides the External Group ID, 5G VN group membership information and 5G VN group data to the UDM. —The UDM updates the Internal Group ID-list of the corresponding UE's subscription data in UDR, if needed. —The UDM updates the Group Identifier translation in the Group Subscription data with the Internal Group ID, External Group ID and list of group members, if needed. —The UDM stores/updates the 5G VN group data (PDU session type, DNN and S-NSSAI, Application descriptor, Information related with secondary authentication/authorization) in UDR. NOTE: It is assumed that all members of a 5G VN group belong to the same UDM Group ID. The NEF can select a UDM instance supporting the UDM Group ID of any of the member GPSIs of the 5G VN group.

If a UE is member of a 5G VN Group, UDM retrieves UE subscription data and corresponding 5G VN group data from UDR, and provides the AMF and SMF with UE subscription data with 5G VN group data included. The PCF generates URSP rules based on 5G VN group data. The PCF retrieves 5G VN group data from UDR. The PCF(s) that have subscribed to modifications of 5G VN group data receive(s) a Nudr_DM_Notify notification of data change from the UDR. The PCF receives at the UE Policy association establishment the Internal Group ID from the AMF, so that PCF identifies the 5G VN group data that needs to be used to generate URSP rules to the UE. An AF may update the UE Identities of the 5G VN group at any time after the initial provisioning. In this Release of the specification, only a 1:1 mapping between DNN and 5G VN group is supported.

The PCF delivers 5G VN group configuration information (DNN, S-NSSAI, PDU session type) to the UE for each GPSI that belongs to a 5G-LAN group. The 5G VN group configuration information is delivered in the URSP from the PCF to the UE using the UE Configuration Update procedure for transparent UE Policy delivery as described in TS 23.502 [3] clause 4.2.4.3 and TS 23.503 [45] clause 6.1.2.2.

According to 5.29.3, PDU Session management, session management as defined for 5GS in clause 5.6 is applicable to 5GLAN-type services with the following clarification and enhancement: —A UE gets access to 5G LAN-type services via a PDU Session of IP PDU Session type or Ethernet PDU Session type. —A PDU Session provides access to one and only one 5G VN group. —A dedicated SMF is responsible for all the PDU Sessions for communication of a certain 5G VN group. SMF selection is described in clause 6.3.2. NOTE 1: The network is configured so that the same SMF is always selected for a certain 5G VN group. NOTE 2: Having a dedicated SMF serving a 5G VN does not contradict that redundancy solutions can be used to achieve high availability. —A DNN and a S-NSSAI are associated with a 5G VN group. —The UE provides a DNN associated with the 5G VN group to access the 5G LAN-type services for that 5G VN, using the PDU Session Establishment procedure described in TS 23.502 [3], clause 4.3.2. —During establishment of the PDU Session, secondary authentication as described in clause 5.6.6 and in TS 23.502 [3], clause 4.3.2.3, may be performed in order to authenticate and authorize the UE for accessing the DNN associated with the 5G VN group. Authentication and authorization for a DNN using secondary authentication implies authentication and authorization for the associated 5G VN group. There is no 5G VN group specific authentication or authorization defined. —The SM level subscription data for a DNN and S-NSSAI available in UDM, as described in clause 5.6.1, applies to the DNN and S-NSSAI associated to a 5G VN group. —Session management related policy control for a DNN and S-NSSAI as described in TS 23.502 [3], is applicable to the DNN and S-NSSAI associated to a 5G VN group. This includes also usage of URSP, for the UE to determine how to route outgoing traffic to a PDU Session for the DNN and S-NSSAI associated to a 5G VN group. —Session and service continuity SSC mode 1, SSC mode 2, and SSC mode 3 as described in clause 5.6.9 are applicable to N6-based traffic forwarding of 5G VN communication within the associated 5G VN group. —A PDU Session provides unicast, broadcast and multicast communication for the DNN and S-NSSAI associated to a 5G VN group. The PSA UPF determines whether the communication is for unicast, broadcast or multicast based on the destination address of the received data, and performs unicast, broadcast or multicast communication handling. —During the PDU Session Establishment procedure, the SMF retrieves SM subscription data related to 5GLAN type service from the UDM as part of the UE subscription data for the DNN. —In order to realize N19 traffic routing, the SMF correlates PDU sessions established to the same 5G VN group and uses this to configure the UPF with the group level N4-session including packet detection and forwarding rules for N19 tunnelling forwarding.

According to 5.29.4, User Plane handling, User Plane management as defined for 5GS in clause 5.8 is applicable to 5G LAN-type services with the following clarifications:

There are three types of traffic forwarding methods allowed for 5G VN communication: —N6-based, where the UL/DL traffic for the 5G VN communication is forwarded to/from the DN; —N19-based, where the UL/DL traffic for the 5G VN group communication is forwarded between PSA UPFs of different PDU sessions via N19. N19 is based on a shared User Plane tunnel connecting PSA UPFs of a single 5G VN group. —Local switch, where traffic is locally forwarded by a single UPF if this UPF is the common PSA UPF of different PDU Sessions for the same 5G VN group.

The SMF handles the user plane paths of the 5G VN group, including: —The SMF may prefer to select a single PSA UPF for as many PDU sessions (targeting the same 5G VN group) as possible, in order to implement local switch on the UPF. —(if needed) Establishing N19 tunnels between PSA UPFs to support N19-based traffic forwarding.

For Ethernet PDU Session, the SMF may instruct the UPF(s) to classify frames based on VLAN tags, and to add and remove VLAN tags, on frames received and sent on N6, as described in clause 5.6.10.2. NOTE 1: For handling VLAN tags for traffic on N6, TSP ID could also be used as described in clause 6.2.2.6 of TS 23.503 [45]. Further description on User Plane management for 5G VN groups is available in clause 5.8.2.13.

When N6-based traffic forwarding is expected, after creation of a 5G VN group the AF can influence the traffic routing for all the members of the 5G VN group, by providing information identifying the traffic, DNAI(s) suitable for selection and an optional indication of traffic correlation together with a 5G VN External Group ID identifying the 5G VN group in an AF request sent to the PCF, as described in clause 5.6.7. If the optional indication of traffic correlation is provided, it means the PDU sessions of the 5G VN group member UEs should be correlated by a common DNAI in the user plane for the traffic. The PCF transforms the AF request into policies that apply to PDU Sessions of the 5G VN group and sends the policies to the SMF. According to the policies, the SMF (re)selects DNAI(s) for the PDU Sessions and configures their UP paths to route the traffic to the selected DNAI(s). If the policies include the traffic correlation indication, the SMF (re)selects a common DNAI for the PDU Sessions so that the traffic of the 5G VN group is routed to the common DNAI. NOTE 2: When receiving a new PDU session establishment request for a 5G VN group, to avoid unnecessary N19 tunnels between UPFs, SMF can check previously selected UPFs for the same 5G VN group, and decide whether a previously selected UPF could serve the requested PDU session. NOTE 3: N19 tunnel(s) can be established between a new UPF and other UPF(s) that belongs to a 5G VN group when the new UPF is selected for the 5G VN group during PDU session establishment. The N19 tunnel(s) to a UPF can be released during or after PDU session release when there is no more PDU sessions for a 5G VN group in that UPF. Establishment or release of the N19 tunnels at the UPF is performed within a group-level N4 Session.

From TS 33.501 (Release-16), according to 6.12.3, subscription temporary identifier, a new 5G-GUTI shall be sent to a UE only after a successful activation of NAS security. The 5G-GUTI is defined in TS 23.003 [19]. Upon receiving Registration Request message of type "initial registration" or "mobility registration update" from a UE, the AMF shall send a new 5G-GUTI to the UE in the registration procedure. Upon receiving Registration Request message of type "periodic registration update" from a UE, the AMF should send a new 5G-GUTI to the UE in the registration procedure.

Upon receiving Service Request message sent by the UE in response to a Paging message, the AMF shall send a new 5G-GUTI to the UE. This new 5G-GUTI shall be sent before the current NAS signaling connection is released. NOTE 1: It is left to implementation to re-assign 5G-GUTI more frequently than in cases mentioned above, for example after a Service Request message from the UE not triggered by the network. NOTE 2: It is left to implementation to generate 5G-GUTI containing 5G-TMSI that uniquely identifies the UE within the AMF. 5G-TMSI generation should be following the best practices of unpredictable identifier generation. A new I-RNTI shall be sent to a UE only after a successful activation of AS security. On transition of UE to RRC INACTIVE state requested by gNB during RRC Resume procedure or RNAU procedure, the gNB shall assign a new I-RNTI to the UE.

In descriptions of various solutions, UEs, sensors, and devices can be used interchangeably. In addition, 'group operation mode' and 'group communication mode' can be used interchangeably.

For multiple ID allocation to support various group communication modes, according to one embodiment, each device in a group of associated devices can perform an RRC connection procedure including a random access procedure separately to a cell (and additionally a registration procedure), and can receive information of at least one temporary identity associated with a group communication mode in addition to a temporary identity associated with an individual communication mode. During an RRC connection establishment, re-establishment, or resume procedure, a device of the group of associated devices can send group identification information (i.e. the at least one temporary identity associated with the group communication mode). Once all the devices in the group are registered and connected and their mutual association are identified based on the group identification information and/or user subscription information, one or more network entities (e.g. gNBs) may coordinate and configure the group of devices with a group-specific DRX pattern. All or a part of the group of associated devices connected to the same cell may be configured with a group-specific RNTI for delivery of group-specific DL messages.

Figure 2:
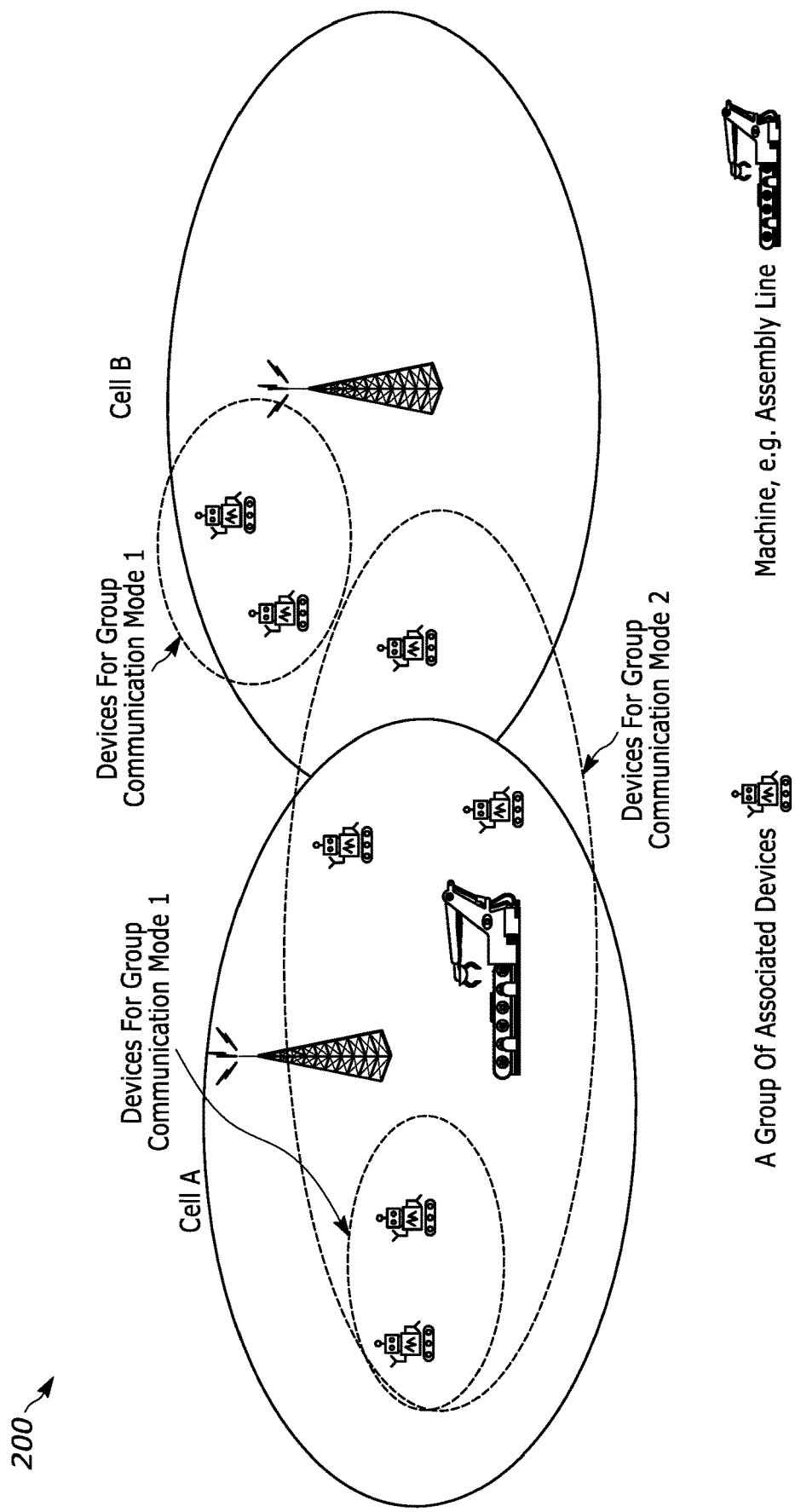
FIG. 2 is an example illustration of a group of associated devices according to a possible embodiment.

FIG. 2 is an example illustration 200 of a group of associated devices according to a possible embodiment. The group of associated devices may be connected to the same or different cells, such as cells A and B, depending on their locations and cell coverages. In one example, all the devices are connected to the same cell. In another example shown in the illustration 200, some devices are connected to one cell, and other devices are connected to another cell. In other examples, some devices are in carrier aggregation and/or dual-connectivity mode, and their serving cells including SpCells (PCells of MCG and SGC) may be different for different devices.

In one implementation, group identification information based on subscription identifiers (e.g. IMSI, SUPI, GPSI) of the group of associated devices is preconfigured and recorded/stored in a 3GPP system (and/or other networks). Additionally, or alternatively, group identification information based on permanent equipment identifiers (e.g. IMEI) is predefined and recorded in the 3GPP system (and/or the other networks). Once a device in the group of associated devices completes a registration procedure (i.e. establishing the user context in the network), association information of the device with the group is retrieved from one or more network function entities (e.g. UDR) and is used for synchronized operation (e.g. synchronized paging for the group of associated devices).

In another implementation, while a device in the group of associated devices performs the registration procedure, the AMF allocates a plurality of temporary identifiers, e.g. 5G-GUTIs, 5G-TMSIs, 5G-S-TMSIs, or I-RNTI, to the device, where a particular temporary identifier of the plurality of temporary identifiers is associated with a particular group operation mode with a particular sub-group of the devices from the group of associated devices or an individual operation mode. The device may receive information of the plurality of temporary identifiers explicitly and/or implicitly. For example, the device receives an indication of one temporary identifier explicitly and derives the other temporary identifiers of the plurality of temporary identifiers from the indicated temporary identifier.

In one example, the device receives a modified 5G-GUTI structured with 'N' 5G-TMSIs as follows:
<5G-GUTI>:=<GUAMI><5G-TMSI 1><5G-TMSI 2> . . . <5G-TMSI N>
where 5G-TIMSI n denotes a temporary identifier associated with n-th group operation mode.

The 5G-S-TMSI n for the n-th group operation mode is the shortened form of the GUTI to enable more efficient radio signaling procedures (e.g. during Paging and Service Request) and is defined as:
<5G-S-TMSI n>:=<AMF Set ID><AMF Pointer><5G-TMSI n>

The higher-layer (e.g. application layer) of the device selects a particular group communication mode 'x', and the RRC layer of the device includes the temporary identifier 5G-S-TMSI_x associated with the group communication mode 'x' in an RRC message (e.g. RRCSetupRequest message).

As specified in TS 38.304 and TS 36.304 for 3GPP access, the NG-RAN uses the 10 Least Significant Bits of the 5G-TMSI in the determination of the time at which different UEs are paged. In other words, Paging Frame (PF) and Paging Occasion (PO) of a particular device are determined based on UE_ID, where UE_ID is set to 5G-S-TMSI mod 1024. For power saving at the device, the AMF may ensure that the 'N' 5G-TMSIs allocated to the device have the common 10 Least Significant Bits, which results in the same UE_ID and accordingly the same PFs and POs for the N 5G-TMSIs.

In another example, the device receives information of a plurality of fullI-RNTI values and/or a plurality of shortI-RNTI values in configuration for the RRC INACTIVE state (e.g. the RRC parameter 'SuspendConfig'), where each fullI-RNTI value and/or each shortI-RNTI value is associated with a particular group operation mode. The device in RRC Inactive state includes the temporary identifier, fullI-RNTI or shortI-RNTI value, associated with a selected group communication mode in an RRC resume request message in order to request resumption of the selected group communication mode.

In other examples, the device receives information of a plurality of C-RNTI values, where each C-RNTI value is associated with a particular group operation mode. The device in RRC_Connected state includes a C-RNTI value associated with a selected group communication mode in Msg3 in 4-step random access procedure or in MsgA PUSCH in 2-step random access procedure.

For indication of a preferred communication mode, according to one embodiment, a device can be operated with either a group communication mode or an individual communication mode and can indicate a preferred operation mode based on one or more device originated traffic types. The group communication mode may support both synchronized group communications of multiple devices and an individual communication, while the individual communication mode only supports the individual communication.

In one implementation, the device may inform a particular operation mode during the RRC connection or RRC resume procedures, e.g. by including an indication of the particular operation mode in an RRC setup request message, an RRC re-establish request message, or an RRC resume request message, as shown in Examples 1, 2, and 3 below. If the device indicates the group communication mode, one or more network entities may send paging messages to other devices in the group.

Example 1: RRCSetupRequest Message

```
-- ASN1START
-- TAG-RRCSETUPREQUEST-START
RRCSetupRequest ::=         SEQUENCE {
    rrcSetupRequest             RRCSetupRequest-IEs
}
RRCSetupRequest-IEs ::=     SEQUENCE {
    ue-Identity                 InitialUE-Identity,
    establishmentCause          EstablishmentCause,
    spare                       BIT STRING (SIZE (1))
    groupCommMode                                   ENUMERATED {True}
}
InitialUE-Identity ::=      CHOICE {
    ng-5G-S-TMSI-Part1          BIT STRING (SIZE (39)),
    random Value                BIT STRING (SIZE (39))
}
EstablishmentCause ::=      ENUMERATED {
        emergency, highPriorityAccess, mt-Access, mo-Signalling,
        mo-Data, mo-VoiceCall, mo-VideoCall, mo-SMS, mps-
Priority Access, mcs-Priority Access,
        spare6, spare5, spare4, spare3, spare2, spare1}
-- TAG-RRCSETUPREQUEST-STOP
-- ASN1STOP
```

Example 2: RRCReestablishmentRequest Message

```
-- ASN1START
-- TAG-RRCREESTABLISHMENTREQUEST-START
RRCReestablishmentRequest ::=       SEQUENCE {
    rrcReestablishmentRequest           RRCReestablishmentRequest-IEs
}
RRCReestablishmentRequest-IEs ::=   SEQUENCE {
    ue-Identity                 ReestabUE-Identity,
    reestablishmentCause        ReestablishmentCause,
    spare                       BIT STRING (SIZE (1))
    groupCommMode                                   ENUMERATED {True}
}
ReestabUE-Identity ::=      SEQUENCE {
    c-RNTI                      RNTI-Value,
    physCellId                  PhysCellId,
    shortMAC-I                  ShortMAC-I
```

```
}
ReestablishmentCause ::=     ENUMERATED {reconfigurationFailure,
handoverFailure, otherFailure, spare1}
-- TAG-RRCREESTABLISHMENTREQUEST-STOP
-- ASN1STOP
```

Example 3: RRCResumeRequest Message

```
-- ASN1START
-- TAG-RRCRESUMEREQUEST-START
RRCResumeRequest ::=        SEQUENCE {
    rrcResumeRequest            RRCResumeRequest-IEs
}
RRCResumeRequest-IEs ::=    SEQUENCE {
    resumeIdentity              ShortI-RNTI-Value,
    resumeMAC-I                 BIT STRING (SIZE (16)),
    resumeCause                 ResumeCause,
    spare                       BIT STRING (SIZE (1))
    groupCommMode                                   ENUMERATED {True}
}
-- TAG-RRCRESUMEREQUEST-STOP
-- ASN1STOP
```

In another implementation, the device may be configured with separate RLC bearer configurations (e.g. RRC parameter RLC-BearerConfig), separate logical channel configurations (e.g. RRC parameter LogicalChannelConfig) and/or separate RLC mode configurations (e.g. RRC parameter RLC-Config) within a RLC bearer configuration, separate SR configurations (e.g. RRC parameter SchedulingRequest-ToAddMod) within a logical channel configuration, and/or separate random access configurations for the group communication mode and the individual communication mode, respectively.

In one example, the device may inform a particular operation mode by selecting a SR resource of a SR configuration associated with the particular operation mode and transmitting SR on the selected SR resource. In another example, the device may inform a particular operation mode by selecting a random access resource (e.g. PRACH preamble and/or PRACH time and frequency resource) of a random access configuration associated with the particular operation mode and performing the RACH procedure with the selected random access resource. In other examples, the device explicitly indicates the particular operation mode in MsgA PUSCH or Msg3 PUSCH during the random access procedure.

For paging, UL timing alignment, and wake-up for group communication, according to one embodiment, for event-triggered group communication (e.g. event-triggered real-time data collection), one device's RRC connection attempt may invoke RRC connection procedures of other devices in the group of associated devices. That is, a network entity initiates paging the other devices in the group in response to reception of an RRC connection request or an RRC resume request from the one device in the group. The network entity may include an AMF, one or more gNodeBs, and/or one or more other network function entities.

In one implementation, the device initiating the RRC connection establishment procedure or RRC connection resume procedure includes its own UE identity (e.g. 5G-S-TMSI, I-RNTI) associated with a particular group operation mode in an RRC connection request message or RRC resume request message. Upon reception of the RRC message including the UE identity associated with the particular group operation mode, the network entity determines a subset of devices from the group of associated devices that need to be paged and sends one or more paging messages to the subset of devices. At a Paging Record for a particularly paged UE in a paging message, the network entity includes a UE identity associated with the particular group operation mode (e.g. NG-5G-S-TMSI-modeX, I-RNTI-Value-modeX as shown in Example 4 below) for the paged UE.

Note that a sensor/device may be part of multiple groups. Including the UE identity associated with the particular group operation mode may allow a specific functionality within the paged UE to be "activated", e.g. only audio is activated by the paging (i.e. the UE should only provide audio data in response to the paging even though there might be also video data available).

Example 4: Paging Message

```
-- ASN1START
-- TAG-PAGING-START
Paging ::=                SEQUENCE {
    pagingRecordList          PagingRecordList
OPTIONAL, -- Need N
    lateNonCriticalExtension    OCTET STRING
OPTIONAL,
    nonCriticalExtension       SEQUENCE{ }
OPTIONAL
}
PagingRecordList ::=       SEQUENCE (SIZE(1..maxNrofPageRec))
OF PagingRecord
PagingRecord ::=           SEQUENCE {
    ue-Identity               PagingUE-Identity,
    accessType                ENUMERATED {non3GPP}
                              OPTIONAL, -- Need N
    ...
}
PagingUE-Identity ::=      CHOICE {
    ng-5G-S-TMSI              NG-5G-S-TMSI-modeX,
    fullI-RNTI                I-RNTI-Value-modeX,
    ...
}
-- TAG-PAGING-STOP
-- ASN1STOP
```

In another implementation, the device initiating the RRC connection establishment procedure or RRC connection resume procedure indicates a group communication mode. In response to receiving a request for the group communication mode, the network entity sends one or more paging messages to the group of associated devices. The network entity includes an indication of the group communication mode at a Paging Record for a particularly paged UE of the group of associated devices in a paging message, as shown in Example 5 below.

Example 5: Paging Message

```
-- ASN1START
-- TAG-PAGING-START
Paging ::=                SEQUENCE {
    pagingRecordList          PagingRecordList
OPTIONAL, -- Need N
    lateNonCriticalExtension    OCTET STRING
OPTIONAL,
    nonCriticalExtension       SEQUENCE{ }
OPTIONAL
}
```

```
PagingRecordList ::=       SEQUENCE (SIZE(1..maxNrofPageRec))
OF PagingRecord
PagingRecord ::=           SEQUENCE {
    ue-Identity               PagingUE-Identity,
    accessType                ENUMERATED {non3GPP}
                              OPTIONAL, -- Need N
    groupCommMode             ENUMERATED
[True}     OPTIONAL,
    ...
}
PagingUE-Identity ::=      CHOICE {
    ng-5G-S-TMSI              NG-5G-S-TMSI,
    fullI-RNTI                I-RNTI-Value,
    ...
}
-- TAG-PAGING-STOP
-- ASN1STOP
```

According to another embodiment, if all the devices in a group of associated devices are in a DRX mode of RRC_Connected state, upon reception of SR or upon reception of a random access preamble and a following Msg3 PUSCH (or upon reception of a 2-step RACH preamble and MsgA PUSCH) from a device in the group, a network entity including one or more gNodeBs may trigger PDCCH-order based random access procedures for other devices in the group that are not uplink synchronized (i.e. for which UL timing alignment timers expired). Alternatively or additionally, the network entity may transmit a wake-up signal/channel to other devices in the group.

In one implementation, a PDCCH commanding a random access procedure and/or a wake-up signal/channel may include an indication of a communication mode, e.g. a particular group communication mode or an individual communication mode.

In other embodiments, if a group of associated devices are located within a few neighbouring cells, a network entity may configure the group of associated devices with a group area that is smaller than a tracking area (for idle state) or a RAN notification area (for inactive state). If the network entity performs paging in accordance with a "group communication mode", i.e. paging the group of associated devices for group communications, the network entity sends one or more paging messages intended to the group of associated devices only in cells corresponding to the group area. In one example, if all the devices in the group are connected to the same cell, the network entity sends paging messages in one cell.

In another embodiment, a UE can indicate a particular group communication mode together with a corresponding access priority in the RRC parameter 'EstablishmentCause' (for an RRC setup request message) or 'ResumeCause' (for an RRC resume request message). Each group communication mode may be assigned with different access priorities depending on the priority of data for a particular group communication mode.

Figure 3:
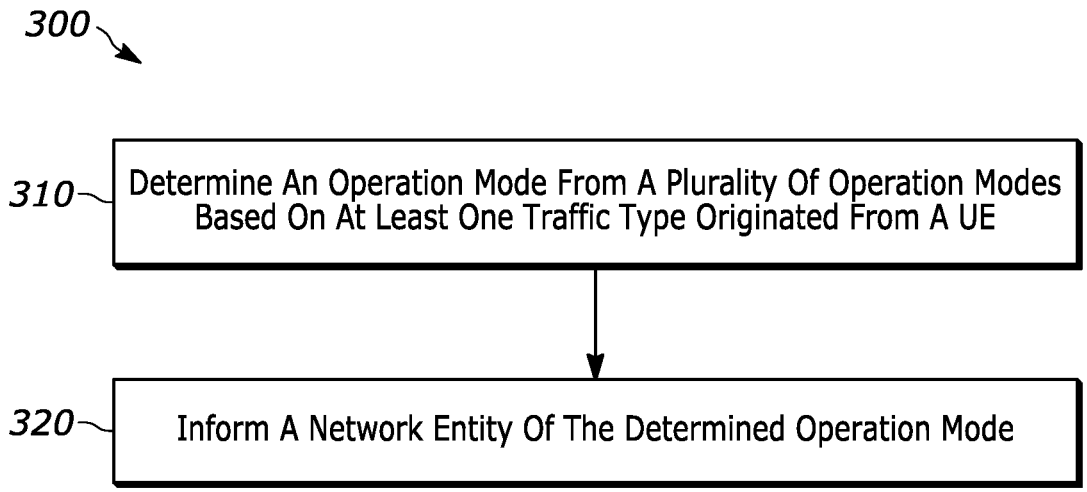
FIG. 3 is an example flowchart illustrating the operation of an apparatus according to a possible embodiment.

FIG. 3 is an example flowchart 300 illustrating the operation of a wireless communication device, such as the UE 110, according to a possible embodiment. At 310, an operation mode can be determined from a plurality of operation modes based on at least one traffic type originated from the UE. The plurality of operation modes can include at least one group operation mode and an individual operation mode. The at least one group operation mode can support a plurality of UEs grouped into a group of UEs. The at least one group operation mode can support at least one network entity communicating associated messages with the group of UEs including the UE. The associated messages can be associated with the group of UEs. Communicating can including transmitting and/or receiving. The at least one network entity can be the same as or different from the network entity that is informed of the determined operation mode. For example, in group operation mode, a group of UEs may be in same or different cells. At 320, a network entity can be informed of the determined operation mode.

According to a possible embodiment, information of a plurality of identifiers can be received. A first identifier of the plurality of identifiers can be associated with a particular group operation mode of a plurality of different group operation modes. A second identifier of the plurality of identifiers can be associated with an individual operation mode. Informing the network entity of the determined operation mode can include transmitting an indication of an identifier associated with the determined operation mode to the network entity. According to a possible implementation, the particular group operation mode can be associated with the group of UEs.

According to a possible implementation, receiving the information of the plurality of identifiers can include receiving an extended 5G-GUTI. The extended 5G-GUTI can include a plurality of 5G-TMSIs. According to a possible implementation, receiving the information of the plurality of identifiers can include receiving a plurality of I-RNTIs. According to a possible implementation, receiving the information of the plurality of identifiers can include receiving a plurality of C-RNTIs.

According to a possible implementation, transmitting the indication can include transmitting the indication of the identifier associated with the determined operation mode in an RRC message. The RRC message can include an RRC setup request message, an RRC resume request message, and/or an RRC reestablishment request message.

According to a possible embodiment, a SR resource of an SR configuration associated with the determined operation mode can be selected. Informing the network entity of the determined operation mode can include transmitting an SR on the selected SR resource.

According to a possible embodiment, a random access resource of a random access configuration associated with the determined operation mode can be selected. Informing the network entity of the determined operation mode can include performing a random access procedure based on the selected random access resource. For example, there can be multiple RA configurations, where each RA configuration can be associated with an operation mode. Also, there can be one RA configuration with different RA resources, where a different RA resource can be associated with a different operation mode.

According to a possible embodiment, each of the plurality of operation modes can correspond to a particular access priority. Informing the network entity of the determined operation mode can include sending an RRC message including the determined operation mode together with a corresponding access priority in an RRC parameter of the RRC message. According to a possible implementation, the RRC parameter can include a 'EstablishmentCause' parameter in an RRC setup request message and/or a 'Resume-Cause' parameter in an RRC resume request message.

According to a possible embodiment, a paging message intended to the UE can be received. The paging message can include information of a particular operation mode from the plurality of operation modes. For example, upon an event, a UE can send a message, which can trigger a paging message to other UEs. According to a possible implementation, for event-triggered group communication (e.g. event-triggered real-time data collection), one device's RRC connection attempt may invoke RRC connection procedures of other devices in the group of associated devices. That is, a network entity initiates paging the other devices in the group in response to reception of an RRC connection request or an RRC resume request from the one device in the group.

According to a possible embodiment, a physical downlink control channel (PDCCH) commanding a random access procedure to the UE can be received. The PDCCH can include information of a particular operation mode from the plurality of operation modes. The operation mode can be indicated explicitly or implicitly. For example, a particular RACH resource can implicitly indicate the operation mode.

According to a possible embodiment, a PDCCH indicating a wake-up for PDCCH monitoring can be received. The PDCCH indicating the wake-up can indicate a particular operation mode from the plurality of operation modes.

According to a possible embodiment, the at least one group operation mode can support both group communications of a plurality of UEs including the UE and individual communications of an individual UE of the plurality of UEs. The individual operation mode can support only individual communications.

Figure 4:
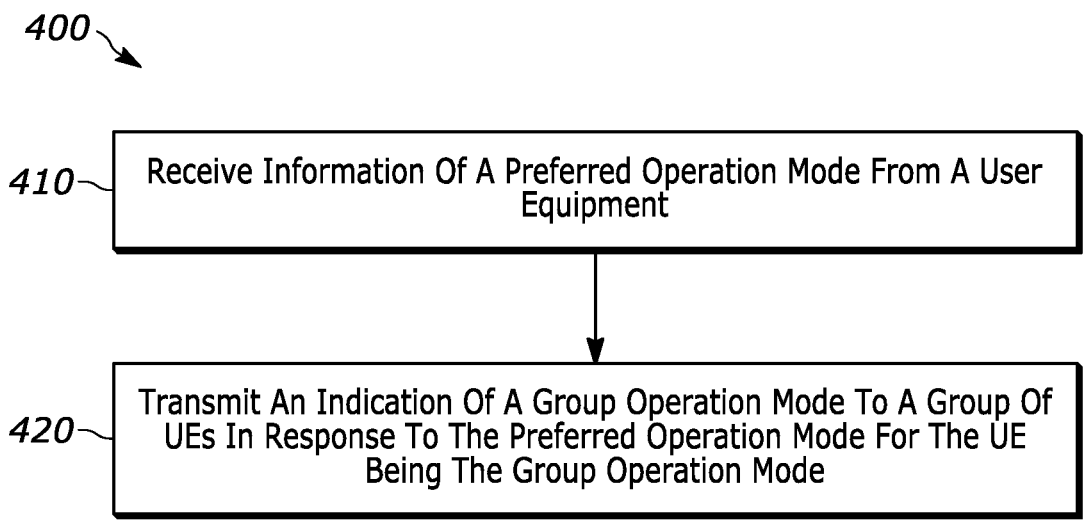
FIG. 4 is an example flowchart illustrating the operation of an apparatus according to a possible embodiment.

FIG. 4 is an example flowchart 400 illustrating the operation of a wireless communication device, such as the network entity 120, according to a possible embodiment. At 410, information of a preferred operation mode can be received from a UE. The preferred operation mode can be determined to be a group operation mode. The group operation mode can include a plurality of UEs grouped into a group of UEs. The group operation mode can be associated with the group of UEs and the UE. The group operation mode can support at least one network entity communicating associated messages with the group of UEs including the UE. The associated messages can be associated with the group of UEs. At 420, an indication of the group operation mode can be transmitted to the group of UEs in response to the preferred operation mode for the UE being the group operation mode.

According to a possible embodiment, the group operation mode can be a first group operation mode. The group of UEs can be a first group of UEs. A determination can be made that the preferred operation mode for the UE is a second group operation mode. An indication of the second group operation mode can be transmitted to a second group of UEs in response to the preferred operation mode for the UE being the second group operation mode. The second group operation mode can be associated with the second group of UEs and the UE. The second group of UEs can be different from the first group of UEs in that at least one UE in each group can be different.

According to a possible embodiment, transmitting the indication of the group operation mode to the group of UEs can include transmitting a paging message including the indication of the group operation mode to the group of UEs. The paging message can be at least one paging message. According to a possible implementation, an RRC message can be received from a UE of the group of UEs. A determination can be made that the RRC message invokes connection procedures for UEs in the group of UEs. Transmitting the paging message can include transmitting the paging message in response to determining the RRC message invokes connection procedures of UEs in the group of UEs. For example, upon an event, a UE can send a message, which can trigger a paging message to other UEs. According to a possible implementation, for event-triggered group communication (e.g. event-triggered real-time data collection), one device's RRC connection attempt may invoke RRC connection procedures of other devices in the group of associated devices. That is, a network entity initiates paging the other devices in the group in response to reception of an RRC connection request or an RRC resume request from the one device in the group.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, mobility management entity, or other network entity, can perform reciprocal operations of a UE. For example, the network entity can transmit signals received by the UE and can receive signals transmitted by the UE. The network entity can also process and operate on sent and received signals.

Figure 5:
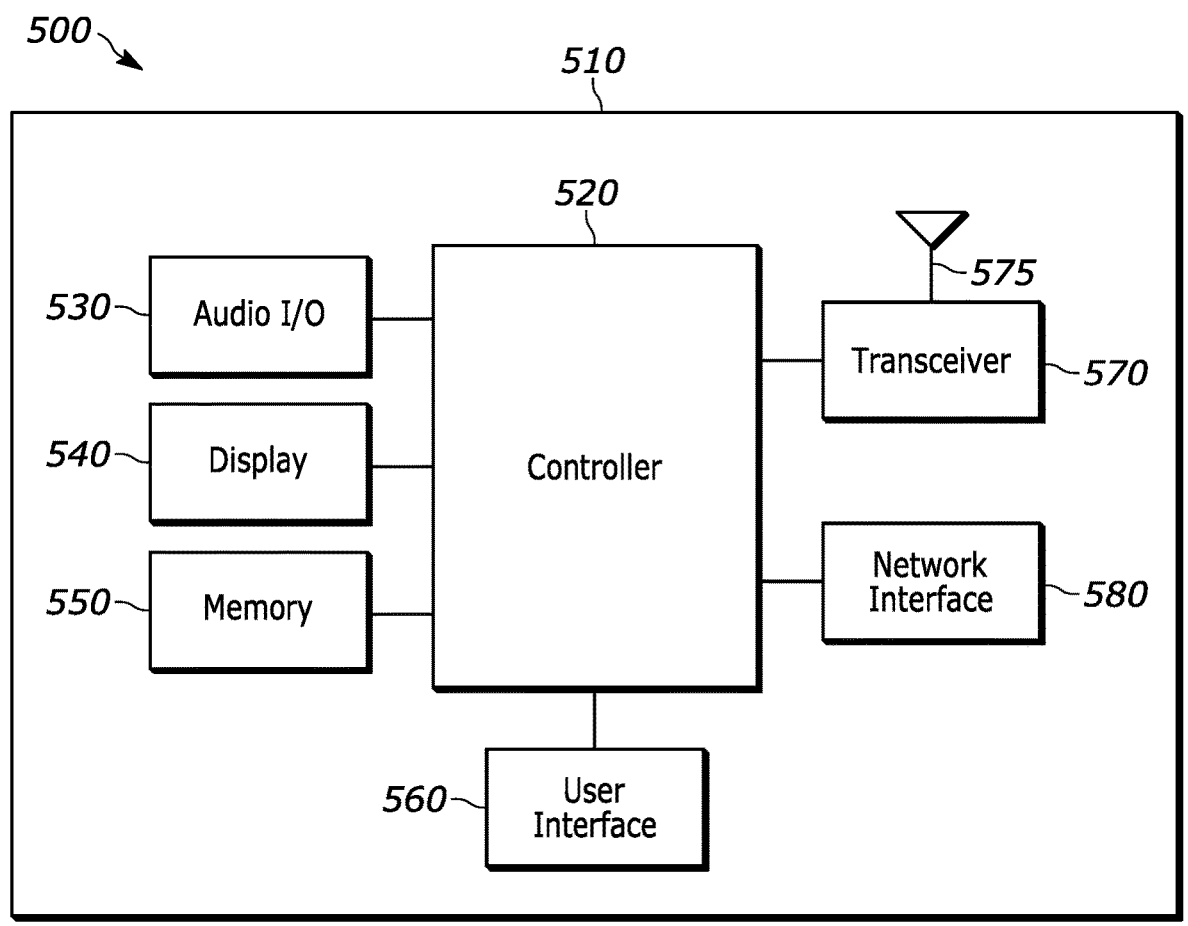
FIG. 5 is an example block diagram of an apparatus according to a possible embodiment.

FIG. 5 is an example block diagram of an apparatus 500, such as the UE 110, the network entity 120, or any other wireless communication device disclosed herein, according to a possible embodiment. The apparatus 500 can include a housing 510, a controller 520 coupled to the housing 510, audio input and output circuitry 530 coupled to the controller 520, a display 540 coupled to the controller 520, a memory 550 coupled to the controller 520, a user interface 560 coupled to the controller 520, a transceiver 570 coupled to the controller 520, at least one antenna port 575, such as at least one antenna, coupled to the transceiver 570, and a network interface 580 coupled to the controller 520. The apparatus 500 may not necessarily include all of the illustrated elements for different embodiments of the present disclosure. The apparatus 500 can perform the methods described in all the embodiments.

The display 540 can be a viewfinder, an LCD, an LED display, an OLED display, a plasma display, a projection display, a touch screen, or any other device that displays information. The transceiver 570 can be one or more transceivers that can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a USB port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 550 can include a RAM, a ROM, an EPROM, an optical memory, a solid-state memory, a flash memory, a removable memory, a hard drive, a cache, or any other memory that can be coupled to an apparatus.

The apparatus 500 or the controller 520 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 550, elsewhere on the apparatus 500, in cloud storage, and/or anywhere else that can store software and/or an operating system. For example, coding for operations can be implemented as firmware programmed into ROM. The apparatus 500 or the controller 520 may also use hardware to implement disclosed operations. For example, the controller 520 may be any programmable processor. Furthermore, the controller 520 may perform some or all of the disclosed operations. For example, at least some operations can be performed using cloud computing and the controller 520 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating an apparatus and implementing the disclosed embodiments. Some or all of the additional elements of the apparatus 500 can also perform some or all of the operations of the disclosed embodiments.

In operation, the apparatus 500 can perform the methods and operations of the disclosed embodiments. The transceiver 570 can transmit and receive signals, including data signals and control signals that can include respective data and control information. The controller 520 can generate and process the transmitted and received signals and information.

In operation according to a possible embodiment, the controller 520 can determine, based on at least one traffic type originated from the apparatus 500, an operation mode from a plurality of operation modes. The plurality of operation modes can include at least one group operation mode and an individual operation mode. The at least one group operation mode can support a plurality of UEs grouped into a group of UEs. The at least one group operation mode can support at least one network entity communicating associated messages with the group of UEs including the apparatus. The associated messages can be associated with the group of UEs. The transceiver 570 can inform a network entity of the determined operation mode.

According to a possible implementation, the transceiver 570 can receive information of a plurality of identifiers. A first identifier of the plurality of identifiers can be associated with a particular group operation mode of a plurality of different group operation modes. A second identifier of the plurality of identifiers can be associated with an individual operation mode. Informing the network entity of the determined operation mode can include transmitting an indication of an identifier associated with the determined operation mode to the network entity.

According to a possible implementation, the controller 520 can select a SR resource of an SR configuration associated with the determined operation mode. Informing the network entity of the determined operation mode can include transmitting an SR on the selected SR resource.

According to a possible implementation, the controller 520 can select a random access resource of a random access configuration associated with the determined operation mode. Informing the network entity of the determined operation mode can include performing a random access procedure based on the selected random access resource.

According to a possible implementation, the transceiver 570 can receive a paging message intended to the apparatus. The paging message can include information of a particular operation mode from the plurality of operation modes.

In IIoT and XR applications exploiting AI/ML, a set of real-time data collected from a group of devices may be used to generate a set of real-time control parameters and/or desired actions at machines or other objects. For real-time control of the machines or other objects and/or real-time rendering, all or most of necessary data from the group of devices may have to be received successfully within a certain time window. In addition, the group of devices may go back to sleep or wake-up together for synchronous operations.

A network architecture, where an aggregator collects data from the group of devices via sidelink communications and relays the data to a network entity of cellular networks, is suitable for low cost MTC devices with small packet sizes. A group-common PDCCH based wake-up signal specified in 3GPP Rel-16 NR may not be directly applicable to remote devices/devices with application-layer level association. At least some embodiments can provide methods for efficient communications with a group of devices/UEs associated in application-level.

A group of associated devices/devices being connected to one or more network entities directly and the one or more network entities coordinating to serve the group of associated devices with synchronous or pseudo-synchronous connection management and DRX operation can effectively handle use cases such as real-time control and XR applications, where sizes of packets and amount of data that each device generates may be much larger compared to low cost MTC devices and yet a group of devices need to be operated in a coordinated manner.

According to at least some embodiments, each device in a group of associated devices performs an RRC connection procedure separately to a cell. Further, during a registration procedure of a device from the group, an AMF allocates a plurality of temporary identifiers, e.g. 5G-TMSIs, to the device, where a particular temporary identifier of the plurality of temporary identifiers is associated with a particular group operation mode with a particular sub-group of the devices from the group or associated with an individual operation mode.

According to at least some embodiments, a device can be operated with either a group communication mode or an individual communication mode and can notify a preferred operation mode based on one or more device originated traffic types.

According to at least some embodiments, for event-triggered group communication, one device's RRC connection attempt may invoke RRC connection procedures of other devices in the group. A network entity initiates paging the other devices in the group in response to reception of an RRC connection request or an RRC resume request from the one device.

At least some embodiments can provide a method in a UE. The method can include determining an operation mode from a plurality of operation modes, based on at least one traffic type originated from the UE. The method can include informing a network entity of the determined operation mode. The plurality of operation modes can include at least one group operation mode and an individual operation mode.

According to a possible embodiment, the method can include receiving information of a plurality of identifiers. A particular identifier of the plurality of identifiers can be associated with a particular group operation mode and an identifier of the plurality of identifiers can be associated with an individual operation mode. Informing the network entity of the determined operation mode can include transmitting an indication of an identifier associated with the determined operation mode to the network entity.

According to a possible implementation of the above embodiment, the particular group operation mode is associated with a particular group of devices. According to a possible implementation of the above embodiment, receiving the information of the plurality of identifiers comprises receiving an extended 5G-GUTI, where the extended 5G-GUTI comprises a plurality of 5G-TMSIs. According to a possible implementation of the above embodiment, receiving the information of the plurality of identifiers comprises receiving a plurality of I-RNTIs. According to a possible implementation of the above embodiment, receiving the information of the plurality of identifiers comprises receiving a plurality of C-RNTIs. According to a possible implementation of the above embodiment, the indication of an identifier associated with the determined operation mode is transmitted in an RRC message. According to a possible example of the above implementation, the RRC message includes at least one of an RRC setup request message, an RRC resume request message, and an RRC reestablishment request message.

According to a possible embodiment, informing the network entity of the determined operation mode comprises selecting a scheduling request (SR) resource of an SR configuration associated with the determined operation mode and transmitting an SR on the selected SR resource. According to a possible embodiment, informing the network entity of the determined operation mode comprises selecting a random access resource of a random access configuration associated with the determined operation mode and performing a random access procedure based on the selected random access resource.

According to a possible embodiment, each of the plurality of operation modes corresponds to a particular access priority. Informing the network entity of the determined operation mode comprises indicating the determined operation mode together with a corresponding access priority in an RRC parameter. According to a possible implementation of the above embodiment, the RRC parameter includes at least one of a parameter 'EstablishmentCause' in an RRC setup request message and a parameter 'ResumeCause' in an RRC resume request message.

According to a possible embodiment, the method can include receiving a paging message intended to the UE, where the paging message comprises an indication of an operation mode from the plurality of operation modes. According to a possible embodiment, the method can include receiving a physical downlink control channel (PDCCH) commanding a random access procedure to the UE, where the PDCCH includes an indication of an operation mode from the plurality of operation modes. According to a possible embodiment, the method can include receiving a PDCCH indicating a wake-up for PDCCH monitoring, where the PDCCH indicating the wake-up includes an indication of an operation mode from the plurality of operation modes. According to a possible embodiment, the at least one group operation mode comprises both a synchronized group communication of a plurality of UEs including the UE and an individual communication. The individual operation mode comprises only the individual communication.

At least some embodiments can provide a method in a network entity. The method can include receiving information of a preferred operation mode from a UE. The method can include transmitting an indication of a first group operation mode to a first group of UEs in response to receiving the information that the preferred operation mode for the UE is the first group operation mode. The first group operation mode is associated with the first group of UEs and the UE. According to a possible embodiment, the method can include transmitting an indication of a second group operation mode to a second group of UEs in response to receiving the information that the preferred operation mode for the UE is the second group operation mode. The second group operation mode is associated with the second group of UEs and the UE. According to a possible embodiment, transmitting the indication of the first group operation mode to the first group of UEs comprises transmitting at least one paging message including the indication of the first group operation mode to the first group of UEs.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

LIST OF ABBREVIATIONS

3GPP 3rd Generation Partnership Project
5G Fifth Generation
5G-CRG 5G-Cable Residential Gateway
5G-GUTI 5G-Global Unique Temporary Identifier
5G-S-TMSI 5G Short-Temporary Mobile Subscription Identifier
5G-TMSI 5G Temporary Mobile Subscription Identifier
ACK Acknowledgement
A-CSI Aperiodic CSI
AMF Access and Mobility Management Function
BFD Beam Failure Detection
AF Application Function
AI Artificial Intelligence
BWP Bandwidth Part
CA Carrier Aggregation
CC Component Carrier
CCCH SDU Common Control Channel Service Data Unit
CCE Control Channel Element
CDMA Code Division Multiple Access
CM Connection Management
CORESET Control Resource Set
CRC Cyclic Redundancy Check
CRI CSI-RS Resource Index
C-RNTI Cell RNTI
CSI-RS Channel State Information Reference Signal
CSI Channel State Information
CSS Common Search Space
DCI Downlink Control Information
DL Downlink
DMRS Demodulation Reference Signal
DNAI Data Network Access Identifier
DRX Discontinuous Reception
E-UTRAN Evolved Universal Terrestrial Access Network
eNB Enhanced NodeB
FDD Frequency Division Duplex
FN-BRG Fixed Network Broadband RG
FN-CRG Fixed Network Cable RG
GCI Global Cable identifier
GERAN GSM EDGE Radio Access Network
GLI Global Line Identifier
gNB New Radio NodeB
GPSI Generic Public Subscription Identifier
GUAMI Global Unique AMF Identifier
GUTI Global Unique Temporary Identifier
HARQ-ACK Hybrid Automatic Repeat Request-Acknowledgement
HST High Speed Train
ID Identifier
IE Information Element
IIoT Industrial Internet of Things
IMEI International Mobile Equipment Identity
IMEISV International Mobile Equipment Identity Software Version
IMSI International Mobile Subscriber Identity
IoT Internet of Things
I-RNTI Inactive Radio Network Temporary Identifier
LTE Long Term Evolution MAC Medium Access Control
MAC CE Medium Access Control Control Element
MCG Master Cell Group
MCS Modulation and Coding Scheme
ML Machine Learning
MPE Maximum Permissible Exposure
MPO MsgA PUSCH Occasion
MsgA Message A
MsgB Message B
mMTC Massive Machine Type Communication
MTC Machine Type Communication
NACK Non-Acknowledgement
NAI Network Access Identifier
NEF Network Exposure Function
NG-RAN Next-Generation Radio Access Network
NR New Radio
NUL Non-supplementary Uplink
OAM Operations, Administration and Maintenance
OFDMA Orthogonal Frequency Division Multiple Access
PCell Primary Cell
PDCCH Physical Downlink Control Channel
PDSCH Physical Downlink Shared Channel
PDU Protocol Data Unit
PEI Permanent Equipment Identifier
PF Paging Frame
PHR Power Headroom Report
P-MPR Power Management Maximum Power Reduction
PO Paging Occasion
PRACH Physical Random Access Channel
PSCell Primary Secondary Cell
PS-RNTI Power Saving RNTI
PUCCH Physical Uplink Control Channel
PUSCH Physical Uplink Shared Channel
QCL Quasi-co-location
RAN Radio Access Network
RAR Random Access Response
RG Residential Gateway
RLF Radio Link Failure
RLM Radio Link Monitoring
RM Registration Management
RNA RAN-based Notification Area
RNTI Radio Network Temporary Identifier
RRC Radio Resource Control
RRM Radio Resource Management
RS Reference Signal
RSRP Reference Signal Received Power
SAR Specific Absorption Rate
SCell Secondary Cell
SCG Secondary Cell Group
SCS Subcarrier Spacing
SFI Slot Format Indicator
SFN Single Frequency Network
S-NSSAI Single Network Slice Selection Assistance Information
SpCell Special Cell (i.e. a PCell of a MCG or SCG)
SP-CSI Semi-persistent CSI
SR Scheduling Request
SRI SRS Resource Indicator
SRS Sounding Reference Signal
SPS Semi-persistent scheduling
SS Search space
SS/PBCH Synchronization Signal/Physical Broadcast Channel
SSBRI SS/PBCH Block Resource Index
SUL Supplementary Uplink
SUPI Subscription Permanent Identifier
TB Transport block
TCI Transmission Configuration Indicator
TC-RNTI Temporary Cell RNTI
TDD Time Division Duplex
TDMA Time Division Multiple Access
TMSI Temporary Mobile Subscriber Identity
UCI Uplink Control Information
UDM Unified Data Management
UDR Unified Data Repository
UE User Equipment
UL Uplink
UPF User Plane Function
URLLC Ultra-Reliable Low-Latency Communication
TRP Transmission and Reception Point
USS UE-specific Search Space
W-5GAN Wireline 5G Access Network
XR eXtended Reality

We claim:

1. A method in a user equipment, the method comprising:
   determining, based on at least one traffic type originated from the user equipment, an operation mode from a plurality of operation modes; and
   informing a network entity of the determined operation mode,
   wherein the plurality of operation modes comprise at least one group operation mode and an individual operation mode, where the at least one group operation mode supports a plurality of user equipments grouped into a group of user equipments, where the at least one group operation mode supports at least one network entity communicating associated messages with the group of user equipments including the user equipment, and where the associated messages are associated with the group of user equipments.

2. The method according to claim 1, further comprising receiving information of a plurality of identifiers, where a first identifier of the plurality of identifiers is associated with a particular group operation mode of a plurality of different group operation modes, and where a second identifier of the plurality of identifiers is associated with an individual operation mode, and
   wherein informing the network entity of the determined operation mode comprises transmitting an indication of an identifier associated with the determined operation mode to the network entity.

3. The method according to claim 2, wherein the particular group operation mode is associated with the group of user equipments.

4. The method according to claim 2, wherein receiving the information of the plurality of identifiers comprises receiving an extended 5G-Globally Unique Temporary Identifier, where the extended 5G-Globally Unique Temporary Identifier comprises a plurality of 5G Temporary Mobile Subscription Identifiers.

5. The method according to claim 2, wherein receiving the information of the plurality of identifiers comprises receiving a plurality of Inactive Radio Network Temporary Identifiers.

6. The method according to claim 2, wherein receiving the information of the plurality of identifiers comprises receiving a plurality of Cell Radio Network Temporary Identifiers.

7. The method according to claim 2, wherein transmitting the indication comprises transmitting the indication of the identifier associated with the determined operation mode in a radio resource control message, where the radio resource control message includes at least one selected from a radio resource control setup request message, a radio resource control resume request message, and a radio resource control reestablishment request message.

8. The method according to claim 1, further comprising selecting a scheduling request resource of a scheduling request configuration associated with the determined operation mode,
wherein informing the network entity of the determined operation mode comprises transmitting a scheduling request on the selected scheduling request resource.

9. The method according to claim 1, further comprising selecting a random access resource of a random access configuration associated with the determined operation mode,
wherein informing the network entity of the determined operation mode comprises performing a random access procedure based on the selected random access resource.

10. The method according to claim 1,
wherein each of the plurality of operation modes corresponds to a particular access priority, and
wherein informing the network entity of the determined operation mode comprises sending a radio resource control message including the determined operation mode together with a corresponding access priority in a radio resource control parameter of the radio resource control message.

11. The method according to claim 10, wherein the radio resource control parameter includes at least one selected from a 'EstablishmentCause' parameter in a radio resource control setup request message and a 'ResumeCause' parameter in a radio resource control resume request message.

12. The method according to claim 1, further comprising receiving a paging message intended to the user equipment, where the paging message comprises information of a particular operation mode from the plurality of operation modes.

13. The method according to claim 1, further comprising receiving a physical downlink control channel commanding a random access procedure to the user equipment, where the physical downlink control channel includes information of a particular operation mode from the plurality of operation modes.

14. The method according to claim 1, further comprising receiving a physical downlink control channel indicating a wake-up for physical downlink control channel monitoring, where the physical downlink control channel indicating the wake-up indicates a particular operation mode from the plurality of operation modes.

15. The method according to claim 1,
wherein the at least one group operation mode supports both
group communications of a plurality of user equipments including the user equipment and
individual communications of an individual user equipment of the plurality of user equipments, and
wherein the individual operation mode supports only individual communications.

16. An apparatus comprising:
a controller that determines, based on at least one traffic type originated from the apparatus, an operation mode from a plurality of operation modes; and
a transceiver coupled to the controller, where the transceiver informs a network entity of the determined operation mode,
wherein the plurality of operation modes comprise at least one group operation mode and an individual operation mode, where the at least one group operation mode supports a plurality of user equipments grouped into a group of user equipments, where the at least one group operation mode supports at least one network entity communicating associated messages with the group of user equipments including the apparatus, and where the associated messages are associated with the group of user equipments.

17. The apparatus according to claim 16,
wherein the transceiver receives information of a plurality of identifiers, where a first identifier of the plurality of identifiers is associated with a particular group operation mode of a plurality of different group operation modes, and where a second identifier of the plurality of identifiers is associated with an individual operation mode, and
wherein informing the network entity of the determined operation mode comprises transmitting an indication of an identifier associated with the determined operation mode to the network entity.

18. The apparatus according to claim 16,
wherein the controller selects a scheduling request resource of a scheduling request configuration associated with the determined operation mode, and
wherein informing the network entity of the determined operation mode comprises transmitting a scheduling request on the selected scheduling request resource.

19. The apparatus according to claim 16,
wherein the controller selects a random access resource of a random access configuration associated with the determined operation mode, and
wherein informing the network entity of the determined operation mode comprises performing a random access procedure based on the selected random access resource.

20. The apparatus according to claim 16, wherein the transceiver receives a paging message intended to the apparatus, where the paging message comprises information of a particular operation mode from the plurality of operation modes.

* * * * *